United States Patent
Tokita (10) Patent No.: US 7,756,662 B2
(45) Date of Patent: Jul. 13, 2010

(54) NON-CONTACT CAPACITIVE SENSOR WITH GAIN AND OFFSET VALUES CALCULATED AS ADJUSTMENT VALUES

(75) Inventor: Mamoru Tokita, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 12/232,054

(22) Filed: Sep. 10, 2008

(65) Prior Publication Data

US 2009/0076769 A1 Mar. 19, 2009

(30) Foreign Application Priority Data

Sep. 14, 2007 (JP) ............................. 2007-238736

(51) Int. Cl.
*G01D 11/00* (2006.01)
(52) U.S. Cl. ..................... 702/97; 702/95; 702/104; 702/150; 324/686

(58) Field of Classification Search ................... 702/97, 702/104, 95, 107, 150; 324/686–690
See application file for complete search history.

(56) References Cited

U.S. PATENT DOCUMENTS

2005/0024065 A1* 2/2005 Umeda et al. ............... 324/663

FOREIGN PATENT DOCUMENTS

JP 10-332312 12/1998

* cited by examiner

*Primary Examiner*—Drew A Dunn
*Assistant Examiner*—Hien X Vo
(74) *Attorney, Agent, or Firm*—Rabin & Berdo, P.C.

(57) ABSTRACT

In a capacitance type of non-contact sensor for detecting the position of an object to be detected, such as dielectric material, a detection gain is changed in a first case where the object to be detected is placed in a first position and also in a second case where the object to be detected is placed in a second position, and an offset value is adjusted for each gain to bring an output value to a predetermined value. The adjusted offset values are stored in order to define a gain and an offset value at a point, where the offset values in the first and second cases are closest, as adjustment values.

2 Claims, 11 Drawing Sheets

NON-CONTACT CAPACITIVE SENSOR WITH GAIN AND OFFSET VALUES CALCULATED AS ADJUSTMENT VALUES

BACKGROUND OF THE INVENTION

1. Field of the Invention

The present invention relates to a positional sensor, and more particularly to a capacitance type of non-contact sensor for detecting the position of an object to be detected, such as dielectric material.

2. Description of the Background Art

Japanese patent laid-open publication No. 332312/1998 discloses such a type of non-contact sensor in which settings for efficiently utilizing a desired detectable range, such as a distance from the sensor to an object to be detected, are readily effected and also an offset or the like is easily adjustable. The non-contact sensor disclosed comprises a limit detector for detecting that an output value from the sensor indicates the limit position of the linear detectable range, and a display unit for indicating that the limit detector has detected that it is positioned at the limit position stated above. With this configuration, the sensor is adjustable to render the sensor output value to be zero.

Although the above conventional method of sensor adjustment makes it easier to adjust the offset at the limit position of the detectable range, the optimization of the offsets throughout the entire detectable range is not taken into account. Consequently, the gain and offset could not optimally be adjusted.

SUMMARY OF THE INVENTION

It is an object of the present invention to provide a non-contact capacitive sensor applicable to a variety of utilities, such as automatic consumer transaction machine adapted to detect the proximity of an object to be detected for thereby conducting a transaction.

In accordance with the present invention, a non-contact capacitive sensor for detecting a position of an object to be detected includes a gain adjuster for changing a gain within a predetermined range of value, an offset adjustment section for adjusting an offset value for each gain thus changed so as to obtain predetermined output values in a first case where the object to be detected is placed in a predetermined first position and a second case where the object to be detected is placed in a predetermined second position, and an offset value storage for storing the offset value for each gain. A gain value is calculated where the stored offset values in the first and second cases are closest to each other to thereby define the gain value thus obtained and an offset value corresponding to the gain value as adjustment values.

With the above configuration, a gain and an offset can be adjusted reliably to optimum gain and offset values, respectively, at a desired position in a short period of time.

BRIEF DESCRIPTION OF THE DRAWINGS

The objects and features of the present invention will become more apparent from consideration of the following detailed description taken in conjunction with the accompanying drawings in which common constituent elements are designated by the same reference numerals.

DESCRIPTION OF THE PREFERRED EMBODIMENTS

Figure 1:
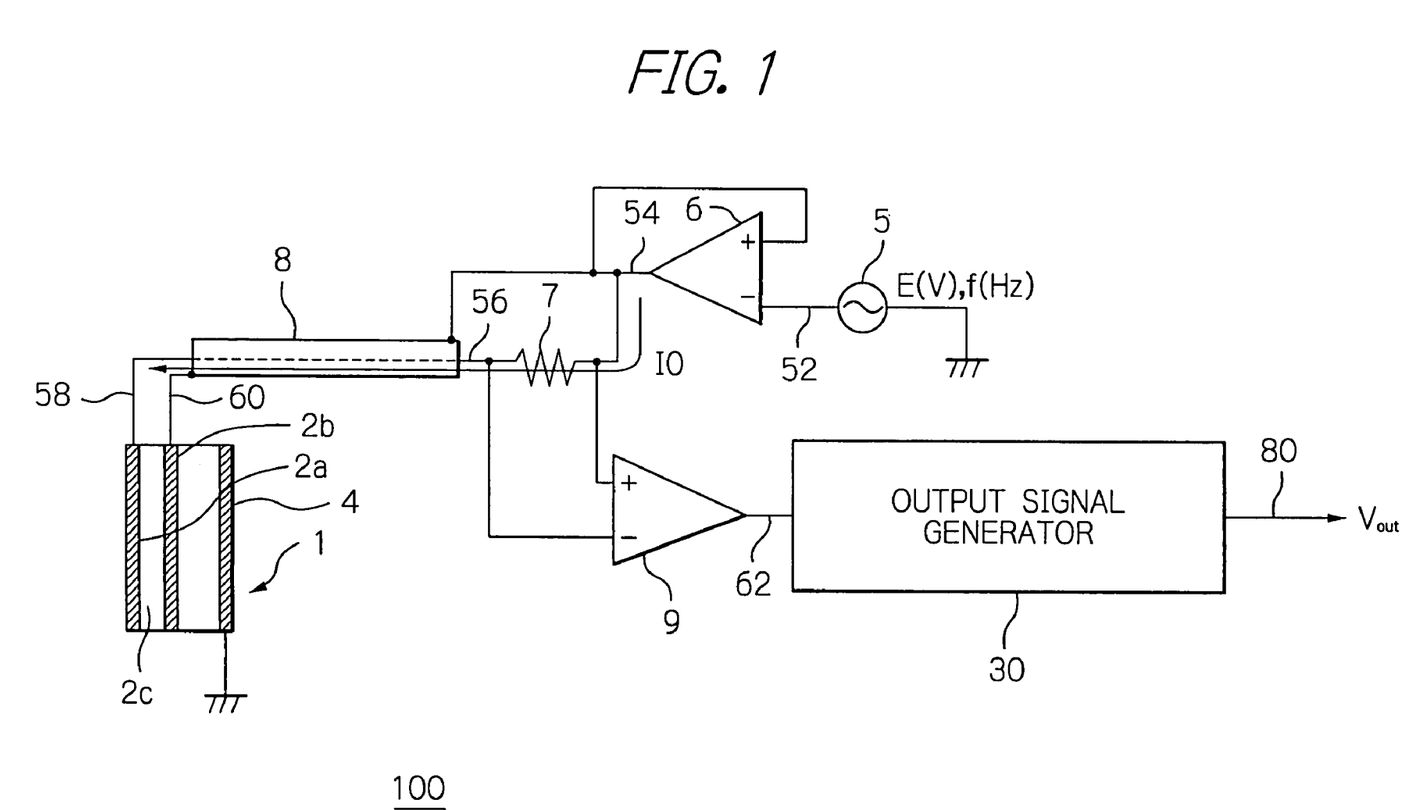
FIG. 1 is a schematic block diagram showing a preferred embodiment of a non-contact sensor in accordance with the present invention.

FIG. 1 is a schematic block diagram showing a preferred embodiment of a non-contact sensor 100 in accordance with the present invention. As seen from the figure, the non-contact sensor 100 comprises a sensor section 1 which has a transmitter electrode 2a, an auxiliary electrode 2b and a ground electrode 4 connected to a reference level, such as ground potential, which are disposed as illustrated.

The non-contact sensor 100 also comprises an oscillator 5 for outputting an alternating voltage E(V) of a signal frequency f(Hz), the oscillator 5 having its output terminal 52 connected to an inverting input terminal (−) of a buffer 6 and its other terminal grounded. The buffer 6 is configured to apply the alternating voltage output from the oscillator 5 to the transmitter electrode 2a. The buffer 6 has its output terminal 54 connected to an input terminal of a current detection resistor 7 that is configured to convert a current I0 passing between the buffer 6 and the transmitter electrode 2a to a corresponding voltage.

The current detection resistor 7 has its output terminal 56 connected to an input terminal provided on one end of the core wire of a length of shield cable 8. The core wire of the shield cable 8 has its other end, serving as an output terminal 58, which is connected to the transmitter electrode 2a. In the shield cable 8, the core wire is enclosed with a shielding sheath or enclosure, which has its one end, functioning as an input terminal, connected to the output terminal 54 which is further interconnected to a non-inverting input port (+) of the buffer 6. The shielding sheath of the shield cable 8 has its other end 60 connected to the auxiliary electrode 2b.

The current detection resistor 7 has its opposite terminals 54 and 56 connected to non-inverting (+) and inverting (−) input terminals of a differential amplifier 9, respectively, in order to amplify a potential difference generated across the resistor 7. The amplifier 9 amplifies the voltage caused across the resistor 7 by a predetermined gain.

The differential amplifier 9 has its output terminal 62 connected to an input terminal of an output signal generator 30, which is adapted to produce an output value (Vout) 80. Thus, signals are designated with the reference numerals of connections on which they are conveyed.

Figure 2:
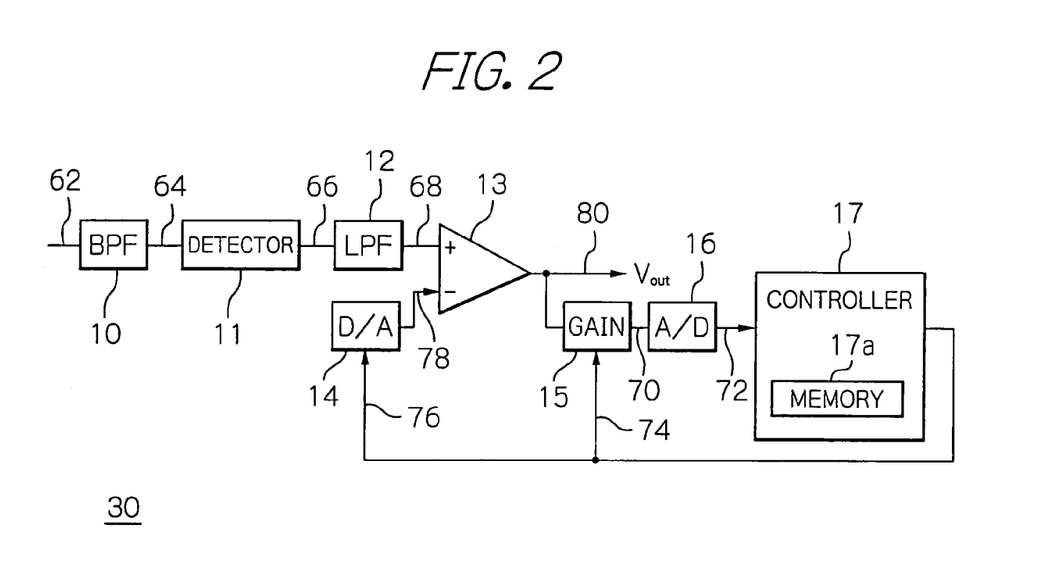
FIG. 2 is a detailed block diagram of an output signal generator of the embodiment shown in FIG. 1.

Reference will be made to FIG. 2, which is a detailed block diagram of the output signal generator 30 shown in FIG. 1. The output terminal 62 of the differential amplifier 9 is connected to a filter 10, which constitutes a band-pass filter (BPF) for passing the component of signal frequency f(Hz) only. The filter 10 has its output terminal 64 connected to an input terminal of a detector 11 for detecting an alternating-current (AC) signal delivered from the amplifier 9 into a corresponding direct-current (DC) signal. The detector 11 has its output terminal 66 connected to an input terminal of a low-pass filter (LPF) 12 that removes a ripple component included in the output signal from the detector 11.

The low-pass filter 12 has its output terminal 68 connected to one of input terminals, e.g. non-inverting input, of another differential amplifier 13 having an offset adjustment function. The amplifier 13 has its other input terminal, e.g. inverting input, connected to an output terminal 78 of a digital-to-analog (D/A) converter 14, of which the function will be described later. The differential amplifier 13 amplifies a difference between the outputs from the low-pass filter 12 and D/A converter 14 by a predetermined magnification to output from its output terminal the amplified difference as an output value (Vout) 80. The output value 80 is fed to a succeeding processing circuit, not shown.

The output terminal of the differential amplifier 13 is also connected to an input terminal of a gain adjuster 15 that is adapted to adjust the gain of the output value 80 delivered thereto. The gain adjuster 15 has its output terminal 70 connected to an input terminal of an analog-to-digital (A/D) converter 16. The A/D converter 16 converts an analog signal 70, amplified from the output value 80 by the gain adjuster 15, to corresponding digital data 72.

The A/D converter 16 has its output terminal 72 connected to an input terminal of a controller 17 that controls an offset value and the gain of the gain adjuster 15. In this embodiment, the controller 17 includes a memory 17a for storing an offset value in association with a gain.

The controller 17 has its output terminal connected to the input terminal 74 of the gain adjuster 15 to supply the gain adjuster 15 with a gain setting made by the controller 17. The output terminal of the controller 17 is also connected to an input terminal 76 of the D/A converter 14, which converts the digital data back 76 into a corresponding analog signal 78, to feed the D/A converter 14 with an offset value calculated by the controller 17. The D/A converter 14 converts the offset value 76 of the digital data supplied by the controller 17 to a corresponding analog signal 78 and then outputs the analog signal 78 to the differential amplifier 13 as an offset adjustment signal.

The output value 80 may be fed to a processing circuit, not shown, succeeding thereto without being converted from the analog signal form, as illustrated in FIG. 1. Alternatively, the digital data 72 converted by the A/D converter 16 may be fed as an output value to such a processing circuit succeeding thereto.

Figure 3:
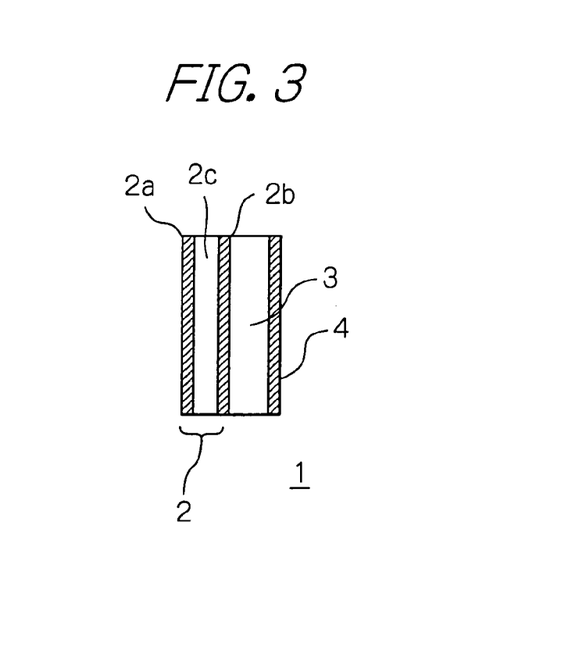
FIG. 3 is a side view showing an electrode part of the non-contact sensor of the embodiment.

FIG. 3 schematically shows in a side view an electrode part of the sensor section 1. In this figure, a printed-circuit board 2 is shown which has a two-layered structure where base material 2c, such as Teflon (trademark), is sandwiched between the transmitter electrode 2a and the auxiliary electrode 2b.

The printed-circuit board 2 and the ground electrode 4 are bonded to a spacer 3 in order to fix their spacing, the spacer 3 being made of insulating material with small dielectric constant such as Teflon (trademark) resin. The ground electrode 4 is made of a plate of electrically conductive material, e.g. metal such as copper, a plate of rubber having electrically conductive particles dispersed therein or a layer of fabric of electrically conductive substance.

Next, the operation of the embodiment of non-contact sensor 100 with the configuration stated above will be described in detail with reference to the operational diagrams of FIGS. 4 and 5 as well as the operational flowchart of FIGS. 6 and 7.

Figure 4:
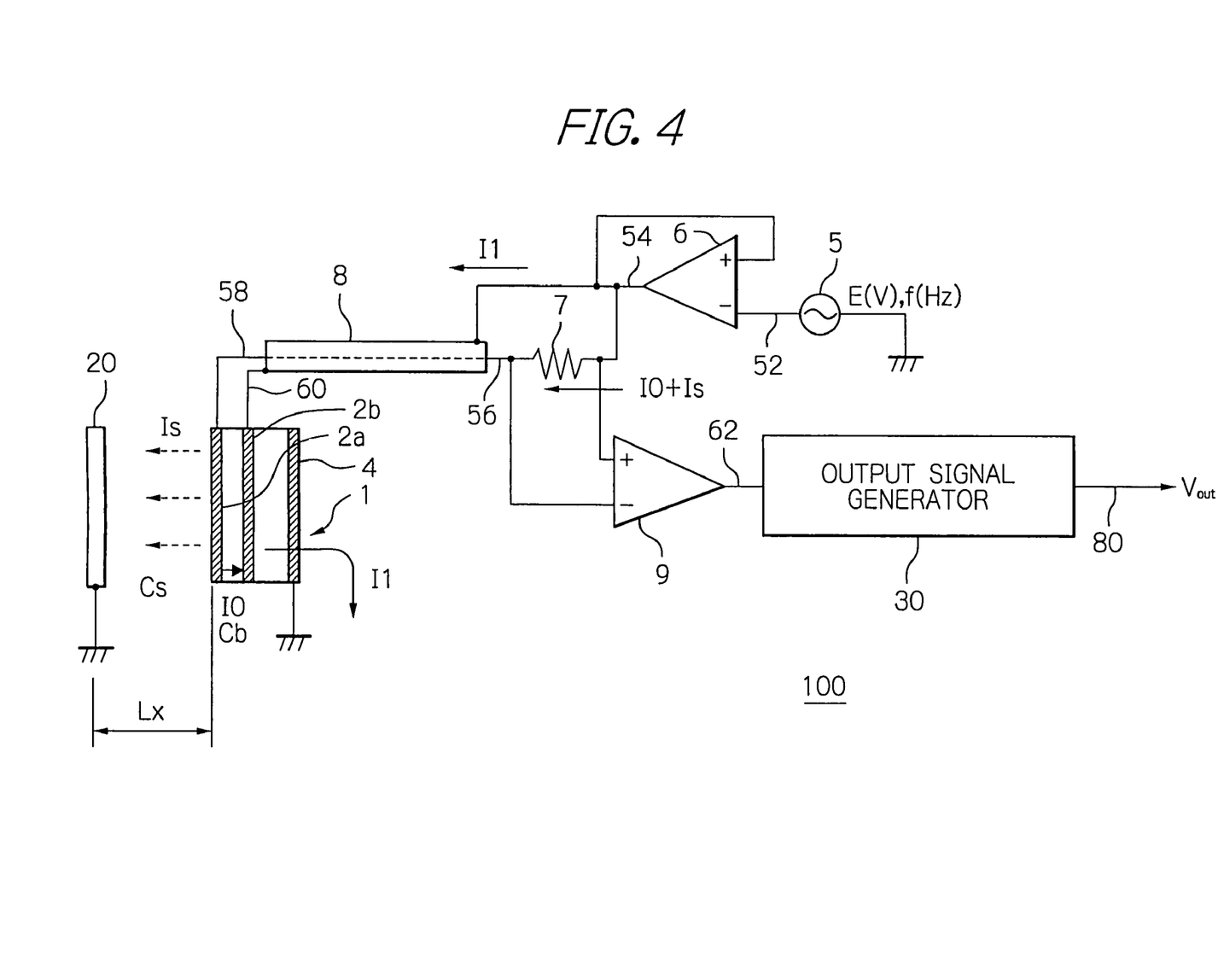
FIG. 4 is a schematic operational diagram for use in understanding the operation of the embodiment.

In FIG. 4, the reference notation I0 represents an electric current which passes through the current detection resistor 7 when no object to be detected 20 is present, and the reference notation I1 represents an electric current which passes through the shielded wire of the shield cable 8.

First, a description will be made for the case where no object to be detected 20 of dielectric material is in the vicinity of the sensor section 1. Note that the words "the case where no object to be detected 20 of dielectric material is in the vicinity of the sensor section 1" practically indicate the case where the object to be detected 20 is arranged at a position where a capacitance formed between the sensor section 1 and the object 20 is substantially equal to zero.

In this case, the transmitter electrode 2a and the auxiliary electrode 2b are maintained at the same potential as each other by the buffer 6 so as to be prevented from serving as a capacitor. Thus, the distance between the transmitter electrode 2a and the auxiliary electrode 2b can be made shorter.

However, the auxiliary electrode 2b opposes the ground electrode 4 thus grounded so that the -auxiliary electrode 2b and the ground electrode 4 work as a capacitor of capacitance Cb. Consequently, an amount of current I1, depending on a power voltage, having its oscillating frequency f and voltage E and applied by the oscillator 5 and on the capacitance Cb, flows from the buffer 6 over the shield cable 8 to the auxiliary electrode 2b and ground electrode 4 and to the ground.

When the current I0 passes, the resistance of the shield cable 8 causes a difference in voltage, although quite small, between the transmitter electrode 2a and the auxiliary electrode 2b.

This difference enables the current to flow through the transmitter electrode 2a and the auxiliary electrode 2b. The current is equal to the current I0 passing through the current detection resistor 7. The current I0 is converted to a corresponding voltage signal by the resistor 7, and the obtained voltage signal is then amplified by the differential amplifier 9 with its predetermined gain to output the amplified signal from the output terminal 62 of the amplifier.

The amplified voltage signal, which is in the form of alternating current, is converted to a signal of direct current by the detector 11, FIG. 2. By the low-pass filter 12, a ripple component included in the DC signal is removed, and then the DC signal is amplified by the differential amplifier 13 with the predetermined gain. The DC signal is further amplified by the gain adjuster 15 with a gain which takes one of the discrete values ranging from A0 to An, inclusive, set by the controller 17, where n is a natural number, which will be described later. The amplified signal is then delivered to the controller 17 in the form of digital data converted by the A/D converter 16. In this embodiment, a default amplification factor of the gain adjuster 15 is A0 and the initial value of the D/A converter 14 is set as "0" without having its offset adjusted.

In this case, since no object to be detected 20 is present in the vicinity of the sensor section 1, the output value 80 will preferably be equal to 0 V. Thus, the output value 80 amplified by the gain adjuster 15 is converted to corresponding digital data 72 by the A/D converter 16, and the obtained data 72 is sent to the controller 17, by which data 76 corresponding to the difference between the digital data 72 and the output value of 0 V used as a target value is set as an offset value D00 in the D/A converter 14. The system may be configured such as to confirm that, at this time, an output value obtained after the offset adjustment is equal to 0 V, thereby acquiring high-precision offset data.

The set digital data 76 is converted by the D/A converter 14 to a corresponding analog signal 78 which is in turn input to the differential amplifier 13. Consequently, the output value 80 is adjusted to 0 V.

Then, the gain of the gain adjuster 15 is changed from A0 to An for n times so as to adjust the output value to be equal to 0 V by each gain, and then the offset values D00 to D0n are calculated in the similar manner.

In the embodiment described above, the offset value is set in the D/A converter 14 each time. However, if the operation range of the differential amplifier 13 is sufficiently broad, the system may then be structured such that the offset values D00 and D10 for the default gain A0 are used as benchmarks in detecting offsets for the successive gains A1 to An, and thereby the detected offset values are defined as D01 to D0n and D11 to D1n.

Next, a description will be made for the case where an object to be detected 20 of dielectric material grounded is located at a predetermined distance Lx from the sensor section 1, and the output value 80 at this situation is adjusted to a predefined amount of voltage Va. In the illustrative embodiment, the default amplification factor of the gain adjuster 15 is defined as A0, as in the case where no object to be detected 20 is present.

In this case, when the object to be detected 20 gets closer to the sensor section 1, the air gap between the transmitter electrode 2a and the ground interposing the object to be detected 20 serves as a capacitor, thereby causing a capacitance Cs. At this time, a current Is conducted in dependent upon the capacitance Cs is added to the current I0, and a resultant current flows through the current detection resistor 7.

As described above, the output value 80 is adjusted to be 0 V in the initial condition, so that the current I0 is treated as if it would be canceled by the differential amplifier 13. Consequently, only the current Is dependent upon the capacitance Cs is amplified by the amplifier 13 and is output as the output value 80.

The output value 80 is then amplified by the gain adjuster 15 with the amplification factor A0, and the amplified output value is converted to digital data 72 by the A/D converter 16. The digital data 72 thus obtained is delivered to the controller 17, in which a calculation is made to obtain a difference between the converted digital data 72 and a target value Va, and data 76 corresponding to the difference thus obtained is set as an offset value D10 in the D/A converter 14. At this time, the output value 80 obtained after the offset adjustment may be confirmed to be the value Va, whereby high-precision offset data can be acquired.

The set digital data is converted to an analog signal by the D/A converter 14, and the obtained signal is input to the input terminal 78 of the differential amplifier 13. Consequently, the output value 80 is adjusted to the value Va.

Then, the gain of the gain adjuster 15 is changed from A0 to An for n times so as to adjust the output value 80 to be the value Va by each gain, and then the offset values D10 to D1n are calculated in the similar manner.

Figure 5:
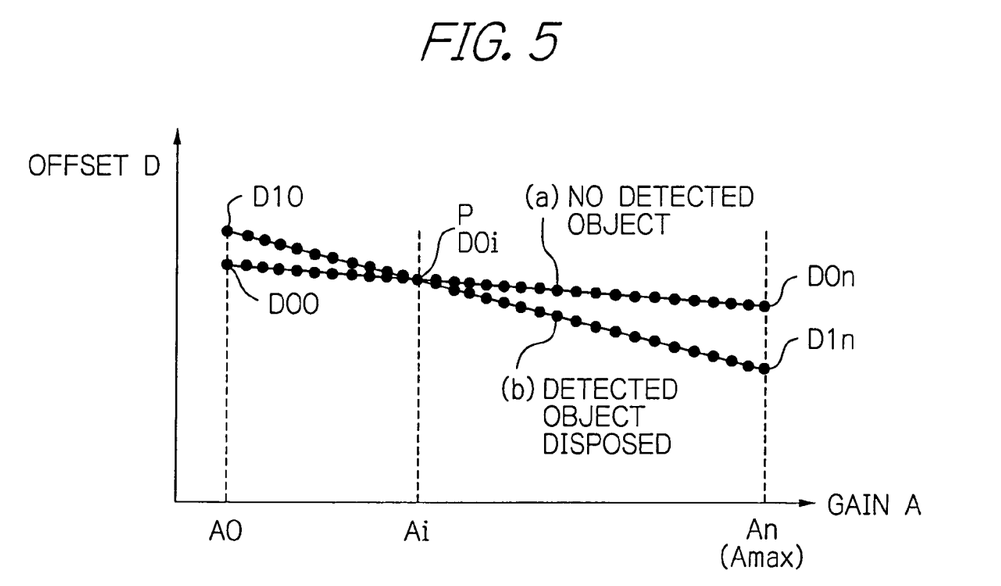
FIG. 5 is a graph for use in understanding the operation of the embodiment.
Figure 6:
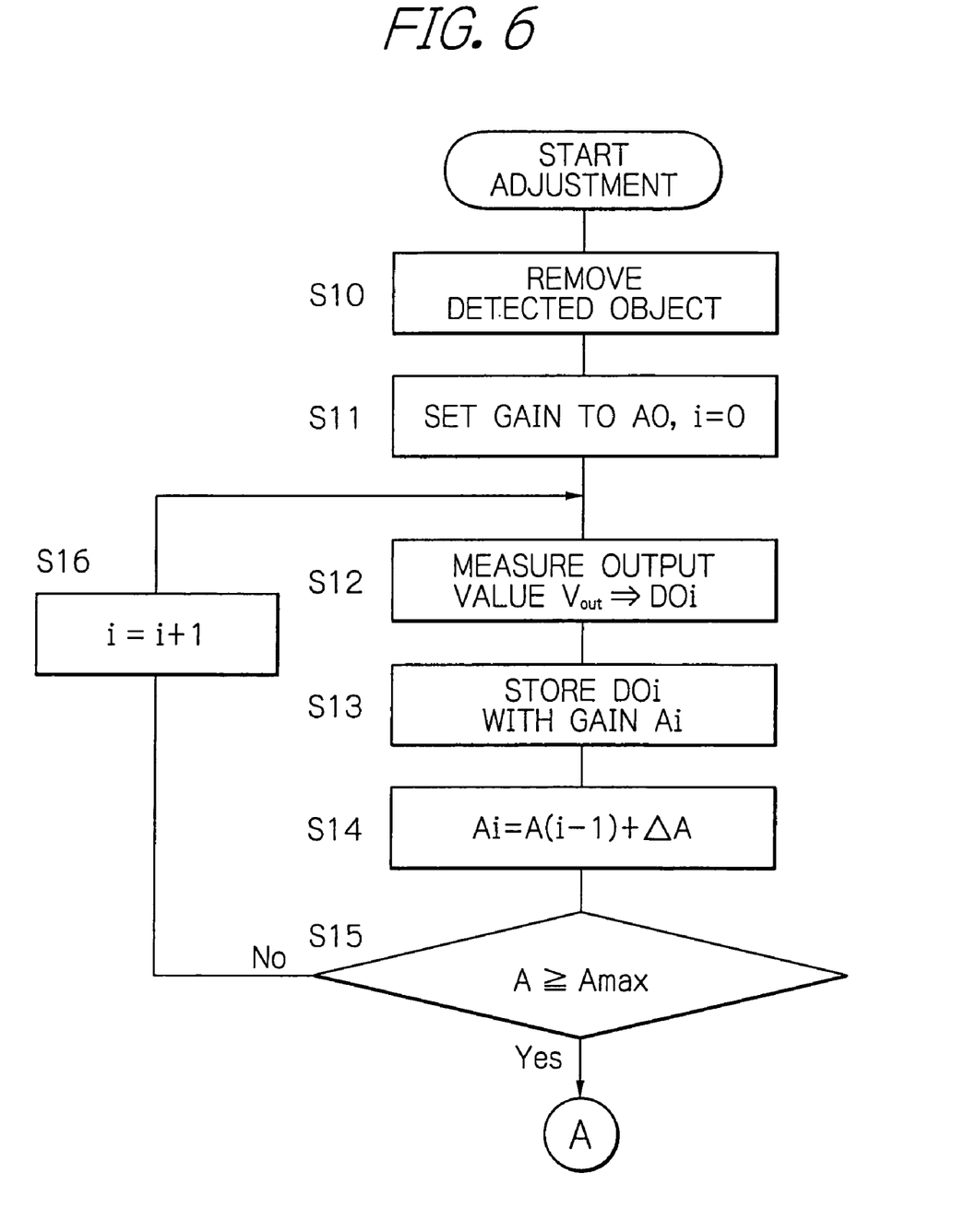
FIGS. 6 and 7 are a series of flowcharts useful for understanding the operation of the embodiment.

FIG. 5 plots the operation results of the cases where the object to be detected is not present and where the object to be detected is placed at the predetermined distance Lx. The horizontal and vertical axes indicate the gain values A and the offset values D, respectively.

In this figure, the curve (a) represents the offset values D00 to D0n which is obtained in such a manner that the gain of the gain adjuster 15 is changed from A0 to An for n times under the condition where no object to be detected 20 is present and then the output value is adjusted to be 0 V by each gain. The curve (b) represents the offset values D10 to D1n which is obtained in such a manner that the gain of the gain adjuster 15 is changed from A0 to An for n times under the condition where the object to be detected 20 is placed at the predetermined distance Lx from the sensor section 1 and then the output value 80 is adjusted to be the certain voltage Va by each gain.

In this embodiment, it is necessary to bring the gain value and the offset value to be equal to each other for the output value 80 (Vout) of the non-contact sensor regardless of whether the object to be detected 20 is not present or is placed at the certain distance Lx from the sensor section 1. This requirement should be satisfied at the point P where the curves (a) and (b) intersect in FIG. 5, i.e. the gain and offset values at the point P are the required ones.

Such an intersection, or crossing, point can be calculated in such a fashion that the offset values D00 to D0n are compared with the values D10 to D1n in the ascending order of the gain to thereby obtain the gain and offset values at a point where the offset values of D0 and D1 are closest to each other.

Now, the above-mentioned operation by the controller 17 will be described in more detail with reference to a series of operational flowcharts shown in FIGS. 6 and 7. Firstly, as illustrated in FIG. 6, the object to be detected 20 is removed (step S10). The gain is set to A0 and a parameter or count value i is set to its initial value, e.g. zero (step S11), and the output value Vout is measured (step S12). Thereby the offset value D00, which is a difference between the measured value and the target output value 0 V for the case where no object to be detected 20 is present, is set in the D/A converter 14 so as to bring the output value Vout to be 0 V. Then, the offset value D00 is stored in the memory 17a in connection with the gain A0 (step S13).

Then a value $\Delta A$ is added to the value A0, which is set as the gain, to define the resultant as the next gain (step S14). The value $\Delta A$ may be a value derived by dividing the difference between the default gain A0 and the last gain An by a predetermined number, or may be any desired small value.

In the next step S15, a determination is made on whether or not the gain A is equal to or more than the value Amax. If the gain A is smaller than the value Amax, the count i is incremented by one (step S16). The operation then returns to step S12 to measure the output value Vout and thereby the offset value D01, which is a difference between the measured value and the target output value 0 V for the case where no object to be detected 20 is present, is set in the D/A converter 14 so as to bring the output value Vout to be 0 V. Then, the offset value D01 is stored in the memory 17a in connection with the gain A1 (step S13).

The above operation is repeated while incrementing the gain, and thereby the offset value D0i is obtained and stored in connection with the gain Ai. When the gain A is equal to or more than the value Amax, the operation with no object to be detected 20 is terminated.

Figure 7:
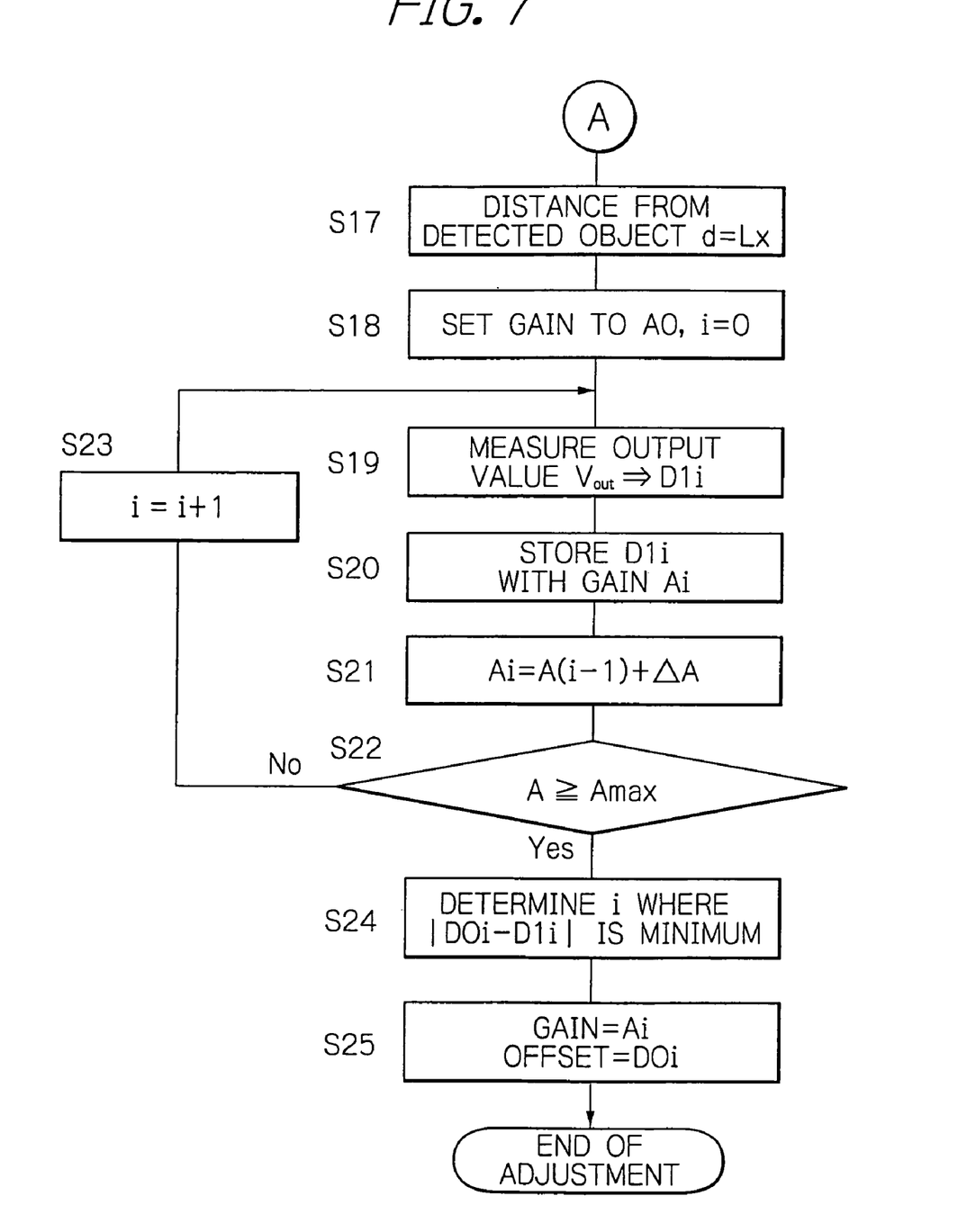

Then, as illustrated in FIG. 7, an object to be detected 20 is placed at the prescribed distance Lx (step S17). The gain value is set to A0 and the count i is set to zero (step S18). The output value Vout is then measured (step S19), and thereby the offset value D10, which is a difference between the measured value and the target output value Va for the case where the object to be detected 20 is placed at the prescribed distance Lx, is set in the D/A converter 14 so as to bring the output value Vout to be Va. Then, the offset value D10 is stored in the memory 17a in association with the gain A0 (step S20).

Then the value $\Delta A$ is added to the value A0 which is set as the gain to define the resultant as the next gain (step S21), and a determination is made on whether or not the gain A is equal to or more than the value Amax (step S22). When the gain A is smaller than the value Amax, the count i is incremented by one (step S23). The operation then returns to step S19 to measure the output value Vout and thereby the offset value D1$i$, which is a difference between the measured value and the target output value Va for the case where the object to be detected 20 is arranged at the predetermined distance Lx, is set in the D/A converter 14 so as to bring the output value Vout to be Va. Then, the offset value D1$i$ is stored in the memory 17$a$ in correspondence with the gain A1 (step S20).

The above operation is repeated while incrementing the gain, and thereby the offset value D1$i$ is obtained and stored in correspondence with the gain A$i$. When the gain A is equal to or more than the value Amax, the operation with the object to be detected 20 placed at the predetermined distance Lx is terminated.

After the gain values and the offset values are stored as the values D0$i$ and D1$i$ as described, respectively, the count value i where the values D0$i$ and D1$i$ are closest to each other is extracted (step S24). Subsequently, the gain A$i$ and the offset value D0$i$ obtained by the count i is extracted in order to set the gain A$i$ and the offset value D0$i$ in the gain adjuster 15 and the D/A converter 14, respectively (step S25), and then the adjustment process is terminated. In the illustrative embodiment, the offset value is set to D0$i$, but the value D1$i$ can be used to the offset value or an average value of D0$i$ and D1$i$, i.e. the resultant value of (D0$i$+D1$i$)/2 can be the offset value.

In summary, the non-contact sensor 100 in accordance with the illustrative embodiment includes the gain adjuster 15 for changing a gain within a predetermined range of value, the controller 17 serving as an offset adjustment section for adjusting an offset value for each gain thus changed so as to obtain predetermined output values in a first case where an object to be detected 20 is not placed and a second case where an object to be detected 20 is placed in a predetermined position, and the memory 17$a$ serving as an offset value storage for storing the offset value for each gain. With this configuration, a gain value is calculated where the stored offset values in the first and second cases are closest to each other to thereby define the gain value thus obtained and an offset value corresponding to the gain value as adjustment values. Thus, the gain and offset can be adjusted reliably to optimum gain and offset values in a desired position in a shorter period of time.

Figure 8:
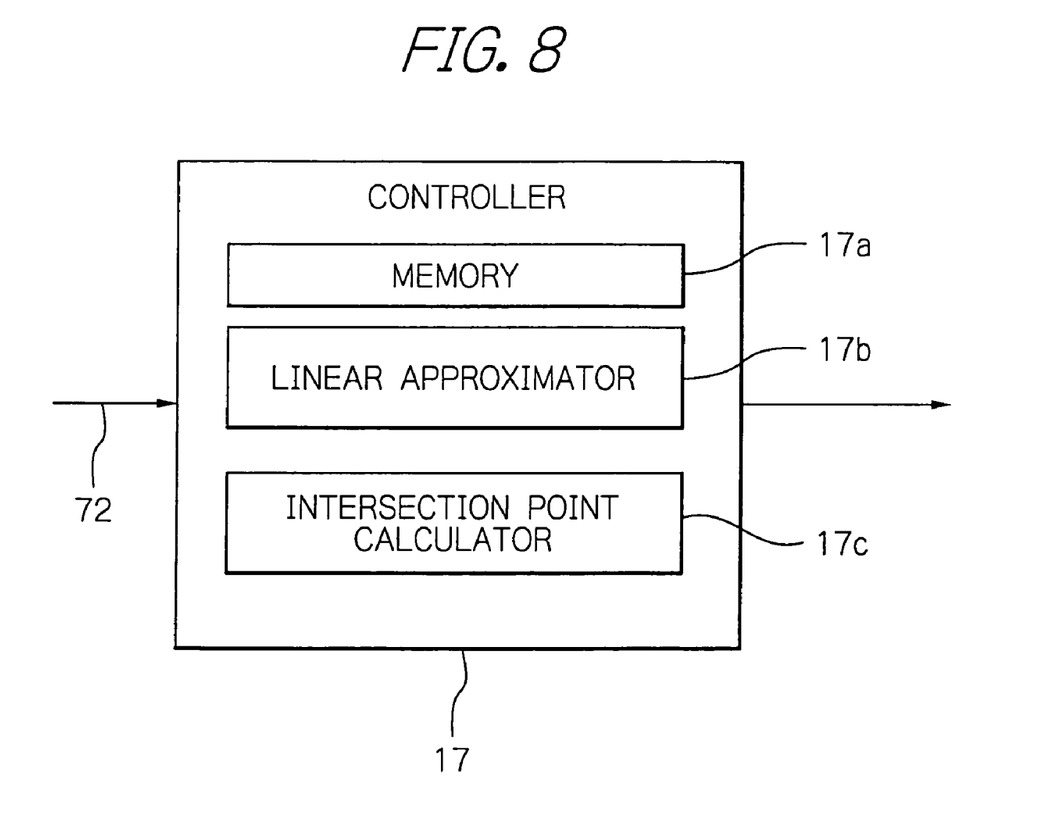
FIG. 8 is a schematic block diagram of a controller included in an alternative embodiment of the non-contact sensor.

Next, an alternative embodiment of the non-contact sensor in accordance with the present invention will be described in detail. The essential configuration of the non-contact sensor 100 in this embodiment is similar to that of the embodiment shown in FIGS. 1 and 2. However, in the alternative embodiment, the controller 17 further includes, as shown in FIG. 8, a straight-line (linear) approximator 17$b$ for deriving approximate straight-lines by means of the gain and offset values stored in the memory 17$a$, and an intersection point calculator 17$c$ for calculating an intersection point of the approximate straight-lines. The whole detailed description of the alternative embodiment will be omitted merely for simplicity.

With this configuration, the alternative embodiment of the non-contact sensor 100 is operated as described below. In the alternative embodiment, the number of measurement points of the non-contact sensor 100 is specified in order to reduce the number of times of measurement.

Firstly, under the condition that no object to be detected 20 is in the vicinity of the sensor section 1, the offset value is sequentially adjusted so as to correspond to the gain at each measurement point and to render the target value to be 0 V, and the adjusted offset values are stored.

By way of example, assuming that the measurement points are five, the value of a gain whose variable range is divided into four quarters is successively changed to the values A0 to A4 in the order of A0, A1, A2, A3 and A4 in the situation that an object to be detected 20 is not present, thereby measuring an offset value corresponding to each gain value and storing resultant offset values as the values D00, D01, D02, D03 and D04. The five measurement points are merely illustrative, and therefore the alternative embodiment is of course be applicable to any other number of measurement points.

Likewise, the offset values are measured in the situation that an object to be detected 20 is placed at the prescribed distance Lx from the sensor section 1 such that the gain is consecutively changed in the order of A0, A1, A2, A3 and A4 to obtain the offset value at each gain value. The obtained offset values are stored as the values D10, D11, D12, D13 and D14.

Figure 9:
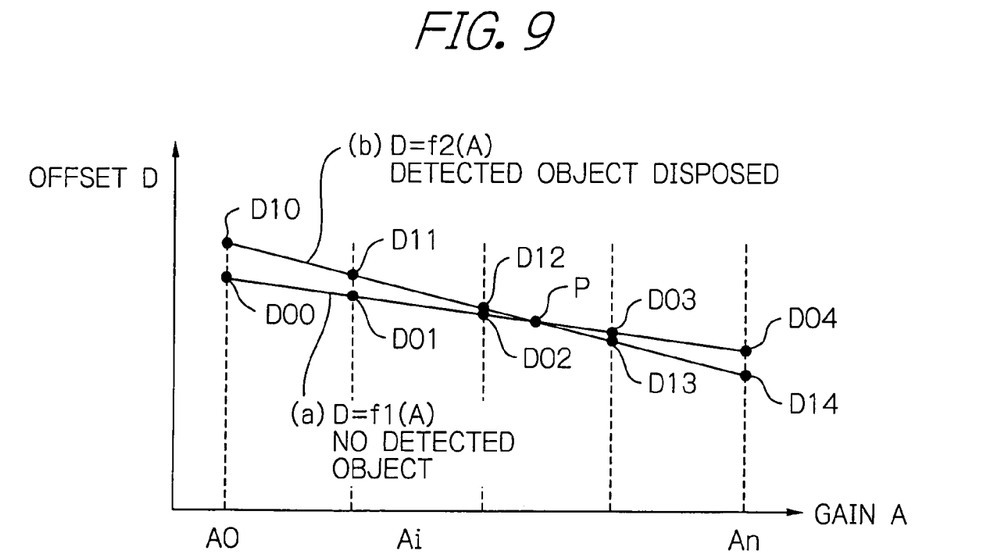
FIG. 9 is a graph for use in understanding the operation of the alternative embodiment in accordance with the present invention.

FIG. 9 plots the resultants of the above operation where the horizontal and vertical axes indicate the gain values A and the offset values D, respectively.

In this figure, the line (a) depicts an approximate straight line for a function D=f1(A) calculated using the measurement data under the condition where no object to be detected 20 is placed, and the line (b) depicts an approximate straight line for the function D=f2(A) calculated using the measurement data under the condition where an object to be detected 20 is placed at the predetermined distance Lx.

In the alternative embodiment, it is necessary, as with the earlier-mentioned embodiment, to bring the gain value and the offset value to be equal to each other for the output value 80 (Vout) of the non-contact sensor regardless of whether an object to be detected 20 is not present or is placed at the certain distance Lx from the sensor section 1. This requirement should be satisfied at the point where the lines (a) and (b) intersect each other in FIG. 9, i.e. the gain and offset values at a point P are the required ones.

The calculation of the approximate straight-line using the measurement data is typically performed according to a regression line approximation based on the least-square method. Now, an example for implementing the straight-line approximation by this method will be described.

In the regression line approximation according to the least-square method, the straight-line approximation of an expression D=a×A+b is performed to obtain constants a and b as below. Here, the letter n represents the number of data minus one. Thus, in this example, the measurement points are five, and therefore the number n is four. That is to say, $$a=(\Sigma(Ai \times Di)-b \times \Sigma Ai)/\Sigma(Ai^2) \quad (1)$$

$$b=(\Sigma Di - a \times \Sigma Ai)/n \quad (2)$$

On the basis of the expressions (1) and (2), the value a can be obtained from the following expression:

$$a=(\Sigma(Ai \times Di)-\Sigma Ai \times \Sigma Di/n)/(\Sigma(Ai^2)-\Sigma Ai \times \Sigma Ai/n) \quad (3)$$

Substitution of the value a, obtained by the expression (3), in the expression (2) yields the value b.

Then, the intersection point of the approximate straight-lines of D=f1(A) and D=f2(A) thus obtained is calculated as a gain value As and an offset value Ds. That is, the intersection point (As, Ds) is derived by the expressions (4) and (5) as follows:

$$As=-(a1-a2)/(b1-b2) \quad (4)$$

$$Ds=(-a1^2+b1^2+a1 \times a2-b1 \times b2)/(b1-b2) \quad (5)$$

Hereinafter, the above-mentioned operation by the controller 17 will be described in detail with reference to a series of operational flowcharts shown in FIGS. 10 and 11. The processes in steps S30 through S34, S36, S38 through S42 and S44 in these figures are similar to those in steps S10 through S14, S16, S17 through S21 and S23 illustrated in FIGS. 6 and 7, respectively, and therefore the description about the same processes will be simplified.

Figure 10:
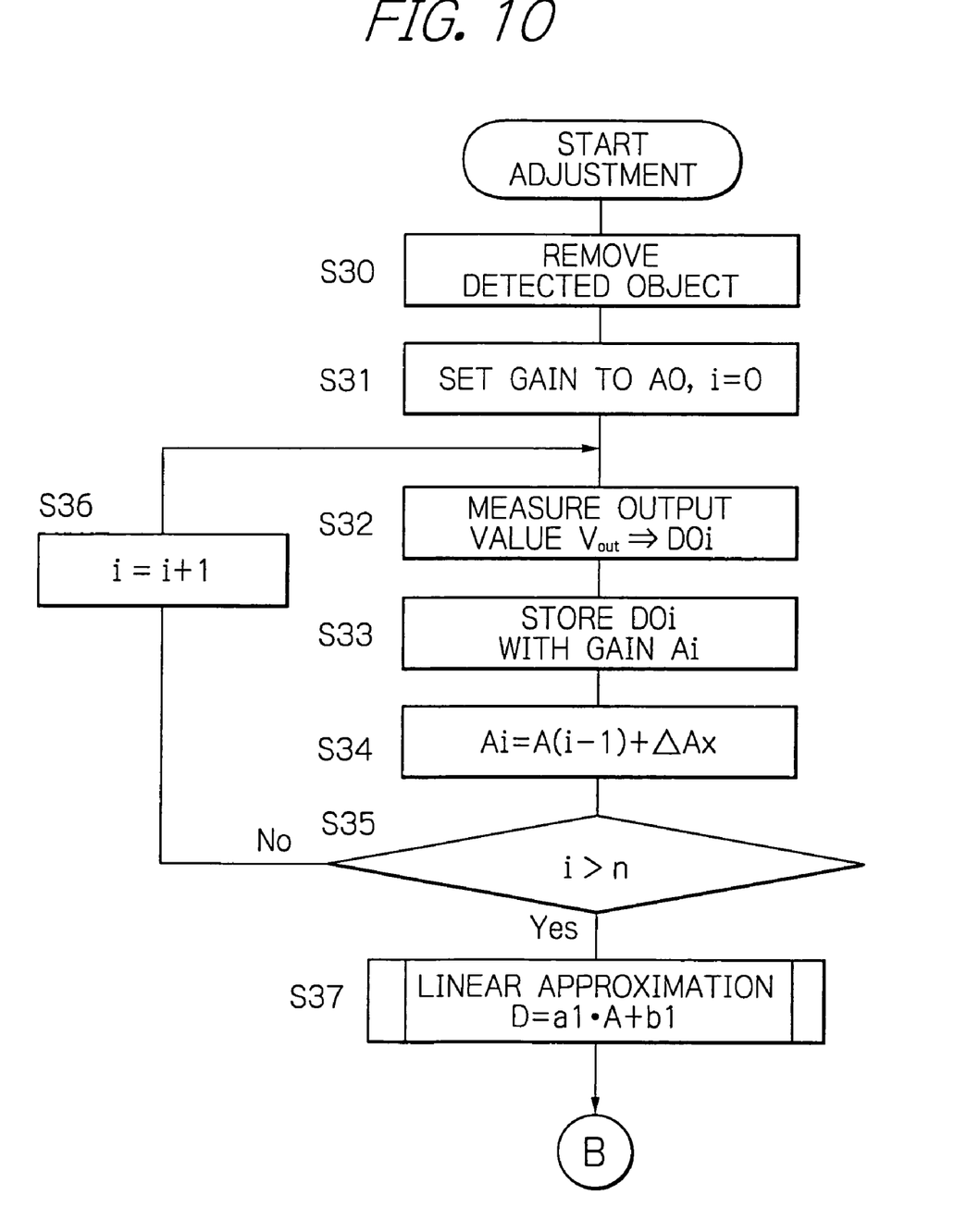
FIGS. 10 and 11 are a series of flowcharts useful for understanding the operation of the alternative embodiment.

Firstly, as shown in FIG. 10, the object to be detected 20 is removed. The gain is set to A0 and a count i is set to zero. Then, the output value Vout is measured. Consequently, the offset value D00, which is a difference between the measured value and the target output value 0 V for the case where no object to be detected 20 is present, is set in the D/A converter 14 so as to bring the output value Vout to be 0 V. Then, the offset value D00 is stored in the memory 17a in association with the gain A0 (steps S30 to S33).

Subsequently, a value ΔAx is added to the value A0, which is set as the gain, to thereby define the resultant as the next gain (step S34). Note that the value ΔAs is preliminarily obtained by dividing the gain variable range (An−A0) by the number of measurement data points which is subtracted by one. Here, assuming that the measurement data points are five, the n is then four, so that the variable range is divided by four in advance.

Then, the count value i is determined on whether or not the value i is greater than the value n. If the count i is equal to or smaller than the value n, then the count i is incremented by one. The operation then returns to step S32 and measures the output value Vout to set the offset value D01, which is a difference between the measured value and the target output value 0 V for the case where no object to be detected 20 is present, in the D/A converter 14 in order to bring the output value Vout to be 0 V. The offset value D01 is stored in correspondence with the gain A1 (steps S35 and S36).

The above operation is repeated to derive the offset value D0i at each measurement point, storing them in correspondence with the gain Ai. When the number of the measurement data exceeds the value n, the constants a1 and b1 of the approximate straight-line of $D=a1 \times A+b1$ are calculated by the aforementioned expressions (1) to (3) using the gain value Ai and the offset value D0i (step S37), and the operation with no object to be detected 20 is terminated afterward.

Figure 11:
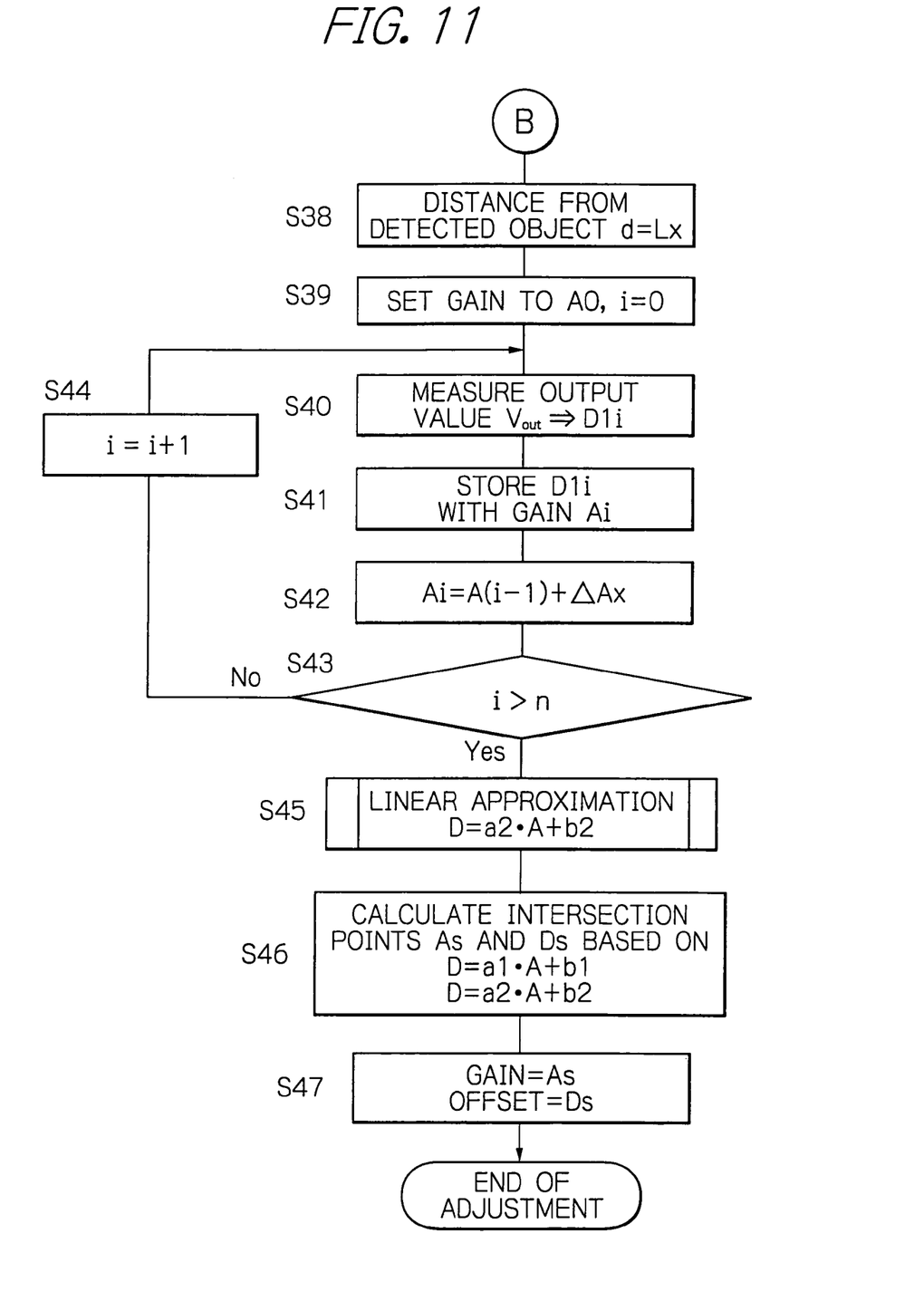

Subsequently to that, as shown in FIG. 11, an object to be detected 20 is placed at the prescribed distance Lx. The gain value is set to A0 and the count i is set to zero. Then, the output value Vout is measured. Then, the offset value D10, which is a difference between the measured value and the target output value Va for the case where the object to be detected 20 is placed at the prescribed distance Lx, is set in the D/A converter 14 so as to bring the output value Vout to be Va. The offset value D10 is stored in correspondence with the gain A0 (steps S38 to S41).

Then the value ΔAx is added to the value A0, which is set as the gain, to thereby define the resultant as the next gain, and a determination is made on whether or not the counter value i is greater than the value n and, when the cout i is equal to or smaller than the value n, the count i is incremented by one (steps S42 to S44). The operation then returns to step S40 to measure the output value Vout for thereby setting the offset value D11, which is a difference between the measured value and the target output value Va for the case where the object to be detected 20 is arranged at the predetermined distance Lx, in the D/A converter 14 so as to bring the output value Vout to be Va. The offset value D11 is then stored in association with the gain A1.

The above operation is repeated to derive the offset value D1i at each measurement point, and the obtained values are stored in correspondence with the gain Ai. When the number of the measurement data reaches the specified number n, the constants a2 and b2 of the approximate straight-line of $D=a2 \times A+b2$ are calculated by the aforementioned expressions (1) (2) and (3) using the gain value Ai and the offset value D1i (step S45), and the operation with the object to be detected 20 placed at the predetermined distance Lx is terminated.

Then, the approximate straight-lines obtained in steps S37 and S45 are used to calculate the intersection point of the gain value As and the offset value Ds by the expressions (4) and (5). The gain values As and the offset value Ds thus derived are set in the gain adjuster 15 and the D/A converter 14, respectively (step S47), and the adjustment process is terminated.

As described above, in accordance with the alternative embodiment of the non-contact sensor, a predetermined number of measurement points are set, and the offset value corresponding to the gain value is measured at each measurement point for the cases where an object to be detected 20 is not placed and where an object to be detected 20 is placed at a predetermined distance. On the basis of the measurement results, the straight-line approximation is implemented for each case in order to calculate the intersection point of the obtained lines, thereby deriving the gain and offset values to be set. Therefore, further advantage is provided as well as the effect provided in the earlier-described embodiment, that is, time required for the measurement can be shortened without affecting the adjustment accuracy.

In the description on the above embodiments, the gain A0 is used as the default value. However, the gain An can instead be used. In the latter case, the offset values are obtained in such a way that the gain A is decremented to the gain A0.

With regard to the object to be detected 20, although means for disposing the object 20 at the predetermined distance Lx and removing the object 20 away has not been described in respect of the above embodiments, such means may be a mechanism for placing and moving in a vertical direction the object to be detected 20 at the predetermined distance Lx, so that the object 20 is placed at the prescribed distance Lx or removed therefrom. Alternatively, the means may be configured to move the object 20 placed at the predetermined distance Lx to where the object does not exert its effect, i.e. to a distance where the capacitance Cs deceases substantially to zero.

Figure 12:
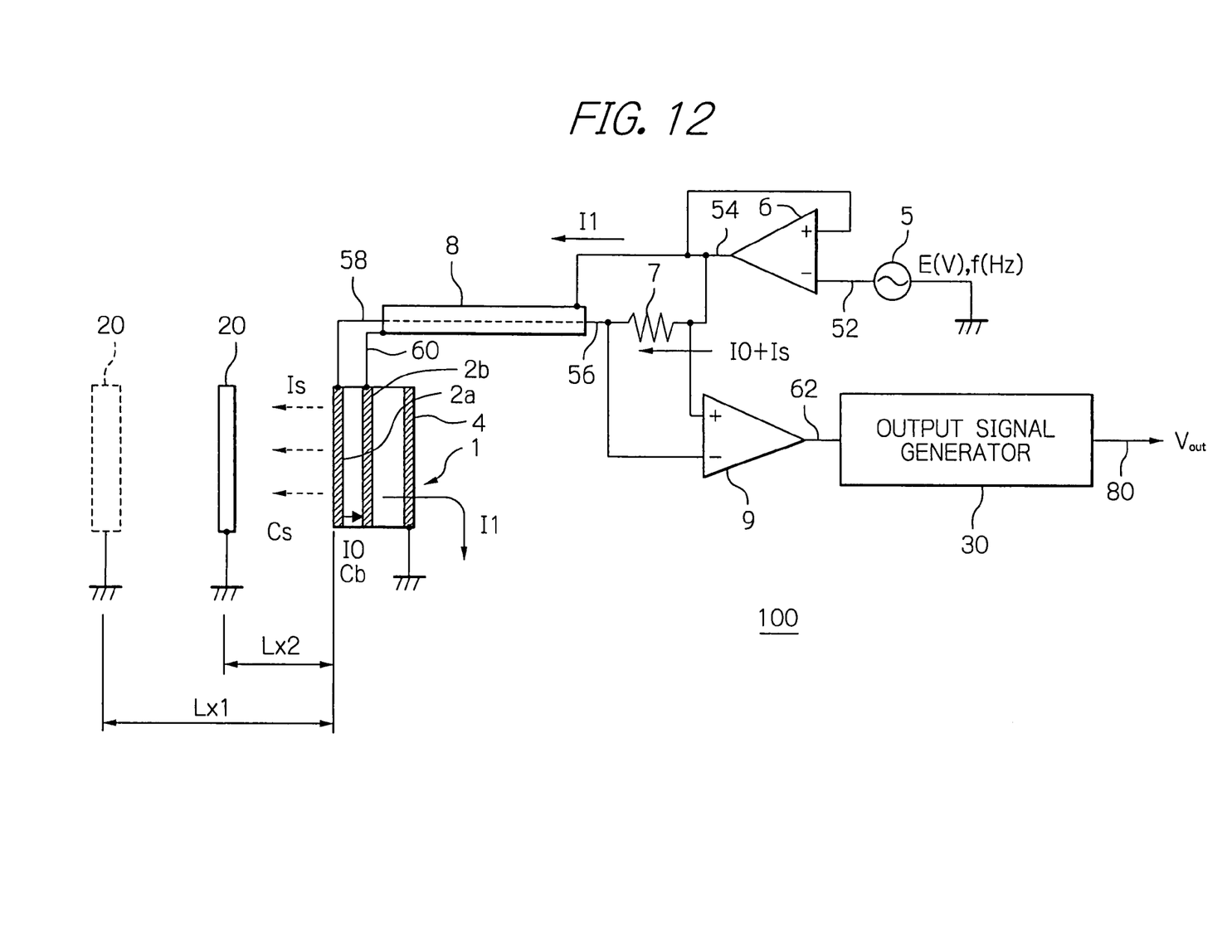
FIG. 12 is a schematic operational diagram of another alternative embodiment of the non-contact sensor.

In the above embodiments, the offset values are measured by changing the gains in the cases where an object to be detected 20 is not present and where an object 20 is placed at the predetermined distance LX to thereby use the acquired measurement data for obtaining the adjustment values. Alternatively, as shown in FIG. 12, the gain and offset values may be measured in the conditions that an object to be detected 20 is placed at a distance Lx1 and that the object 20 is at another distance Lx2 in order to derive the adjustment values.

The entire disclosure of Japanese patent application No. 2007-238736 filed on Sep. 14, 2007, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A non-contact capacitive sensor for detecting a position of an object to be detected, comprising:
    a gain adjuster for sequentially changing a gain which takes any of a predetermined number of discrete values included in a predetermined range of value;
    an offset adjustment section for adjusting an offset value for each of the gains changed so as to obtain predetermined output values in a first case where the object to be detected is placed in a predetermined first position and in a second case where the object to be detected is placed in a predetermined second position;

an offset value storage for storing the offset value for each of the gains;

a straight-line approximator for using the gain and the offset value stored for the first and second cases to derive a first approximate straight line and a second approximate straight line, respectively; and an intersection point calculator for calculating an intersection point at which the first and second approximate straight lines intersect each other, the gain and the offset value at the calculated intersection point being defined as adjustment values.

2. The non-contact sensor in accordance with claim 1, wherein said first case is implemented by placing the object to be detected in a position where a capacitance formed between said non-contact sensor and the object to be detected is substantially equal to zero, and said second case is implemented by placing the object to be detected at a predetermined distance away from said non-contact sensor.

* * * * *